United States Patent Office 2,938,881
Patented May 31, 1960

2,938,881

CHEMICAL COMPOSITION AND PROCESS

George A. Gallagher, Media, Pa., assignor to E. I. du Pont de Nemours and Company, Wilmington, Del., a corporation of Delaware No Drawing. Filed Feb. 6, 1959, Ser. No. 791,513

3 Claims. (Cl. 260—45.7)

This invention is directed to novel fluorine-containing polymer compositions and a process of making them. In particular, the fluoro polymers of the present invention are those which contain recurring units of —$CF_2$— and —$CH_2$— and which have dispersed therein between about 0.1 and 25% of sodium fluoride based on the weight of the polymer.

Fluorine-containing polymers are well known and are of particular value because of this ability to retain their properties at elevated temperatures. At their upper temperature limits, however, all of these polymers generally evolve hydrogen fluoride if their composition contains the units of —$CF_2$— and —$CH_2$—. This, of course, severely limits many applications of these fluoro polymers. For example, glass fibers or fabrics which are coated with such polymers will be destroyed by hydrogen fluoride evolved at high temperatures. Another problem with these polymers is that they often require very high temperatures for extrusion or fabrication and must not degrade during this operation.

It is an object of this invention to improve the high temperature stability of certain fluoro polymers and to eliminate the effects of hydrogen fluoride evolution. It is a further object to improve the processability of these polymers. These and other objects are accomplished by incorporating with such polymers between about 0.1 and 25% of sodium fluoride based on the weight of the polymers.

More specifically, the present invention is directed to a polymeric fluorine-containing elastomer composition stabilized against the evolution of hydrogen fluoride at temperatures above 200° C., said elastomer being a copolymer of vinylidene fluoride and a fluoroolefin taken from the group of chlorotrifluoroethylene and hexafluoropropylene and containing between about 0.1% and about 25% of sodium fluoride based on the weight of the elastomer.

The present invention is also directed to a process of improving a polymeric fluorine-containing elastomer composition by stabilizing said polymer against the evolution of hydrogen fluoride at temperatures above 200° C., said elastomer being a copolymer of vinylidene fluoride and a fluoroolefin taken from the group consisting of chlorotrifluoroethylene and hexafluoropropylene, by dispersing throughout said polymer sodium fluoride in an amount between about 0.1% and about 25% by weight of the elastomer.

The polymers of the present invention which are subject to evolution of hydrogen fluoride at elevated temperatures contain the repeating units of —$CF_2$— and —$CH_2$—. These polymers are copolymers obtained by copolymerizing vinylidene fluoride with a fluoroolefin taken from the group consisting of chlorotrifluoroethylene and hexafluoropropylene.

It will be understood that the repeating —$CF_2$— and —$CH_2$— units need not necessarily compose the entire backbone of the polymer; other repeating units may separate the —$CH_2$— and —$CF_2$— groups. Thus, in the copolymers of chlorotrifluoroethylene with vinylidene fluoride, repeating —CClF— groups will be in the polymer chain.

The fluoropolymers of the present invention are elastomeric compositions such as the copolymer vinylidene fluoride with chlorotrifluoroethylene or with hexafluoropropylene. The degree of elimination of hydrogen fluoride from the fluoropolymers depends somewhat upon the inherent properties of the polymer. Molecular weight variations for example, are reflected by different observed times for hydrogen fluoride elimination to occur at elevated temperatures in the absence of the sodium fluoride additive. In spite of these variations, however, the addition of sodium fluoride to the polymer results in significant improvement and this beneficial effect is evident even up to temperatures at which the polymers decompose; i.e., about 350° to 400° C.

To carry out the process of this invention it is necessary to thoroughly disperse sodium fluoride in the polymer in an amount between about 0.1% and 25% by weight of the polymer; this dispersing step can be accomplished with conventional mixing equipment, e.g., standard rubber mills, Banbury mixers, ball mills, roller mills, or other conventional means of mixing. Sodium fluoride may also be incorporated by addition to an aqueous latex of the polymer prior to its coagulation.

It has been found that when less than about 0.1% of the polymer of sodium fluoride is used, the agent is not present in sufficient quantity to significantly reduce the effects of hydrogen fluoride evolution. Using more than 25% is usually not necessary. Preferably, 5 to 15% sodium fluoride is used to provide adequate protection against the elimination of hydrogen fluoride. While quantities greater than 25% may be used in extreme cases, it is not usually necessary, and excessive quantities detract from the elastomeric properties of the composition.

It is most surprising that sodium fluoride is the only agent that has been found to be usable for the purpose of improving these polymers against the effects of HF elimination. Other fluorides, even other alkali metal fluorides such as potassium fluoride, do not show the very significant effect of sodium fluoride. It has also been observed that incorporation of sodium fluoride into the polymers described above gives an unexpected improvement in processability. The treated polymer appears to act somewhat like a plasticized material in that it is easier to extrude and frabricate than polymer without sodium fluoride. This effect is particularly evident with the elastomeric copolymer of hexafluoropropylene and vinylidene fluoride.

Representative examples illustrating the present invention are as follows.

*Example 1*

Using a rubber mill and employing standard rubber compounding techniques 10 parts of a copolymer of hexafluoropropylene and vinylidene fluoride containing 44% by weight of vinylidene fluoride (intrinsic viscosity of 0.66) was milled for about 15 minutes with various amounts of sodium fluoride after which time the sodium fluoride was thoroughly dispersed in the polymer. Then 0.5 part of the milled polymer was placed in a glass tube approximately 150 mm. long, having an outside diameter of 18 mm. and having walls approximately 2 mm. thick. The tube was then evacuated and heat-sealed to form an ampule approximately 120 mm. long containing the treated polymer. The pressure inside the ampule was less than 1 mm. of mercury. The sealed ampule was heated in a muffle furnace at 288±2° C., until etching of the glass by hydrogen fluoride was observed, thus indicating thermal breakdown of the polymer.

The following table illustrates the results obtained:

| Percent by Weight of Polymer of NaF | Hours to HF Elimination |
|---|---|
| 0 | 6 to 8 |
| 0.1 | 18 to 22 |
| 0.5 | 32 to 38 |
| 1.0 | 86 to 96 |
| 2.0 | 208 to 232 |
| 5.0 | 520 to 544 |

Example 2

Following the procedure of Example 1, 0.2 part of sodium fluoride was milled with 10 parts of several fluoro polymers and the thermal stability of each treated polymer evaluated. The following table illustrates the polymers used and the results obtained:

| Polymer | Weight Percent of NaF | Hours to HF Elimination |
|---|---|---|
| Copolymer of chlorotrifluoroethylene with vinylidene fluoride ("Kel F" 3700) [1] | 2.0 | 16 to 40 |
|  | 0.0 | 0 to 4 |
| Copolymer of chlorotrifluoroethylene with vinylidene fluoride ("Kel F" 5500) [2] | 2.0 | 16 to 40 |
|  | 0.0 | 0 to 4 |

[1] Commercially available from Minnesota Mining and Mfg. Co.
[2] Commercially available from Minnesota Mining and Mfg. Co.

Example 3

Following the procedure of Example 1, 2% by weight of sodium fluoride was milled with copolymers of vinylidene fluoride and hexafluoropropylene having somewhat different physical and chemical properties. The following table shows that sodium fluoride improved each of these polymers:

| Polymer | Percent Hexafluoropropylene | Instrinsic Viscosity | NaF in Polymers (Percent by weight) | Hours to HF Elimination |
|---|---|---|---|---|
| A | 43 | 0.57 | 0.0 | 1 |
|  |  |  | 2.0 | 16 to 40 |
| B | 32 | 1.4 | 0.0 | 2 |
|  |  |  | 2.0 | 72 to 96 |
| C | 55 | 1.3 | 0.0 | 4 |
|  |  |  | 2.0 | 288 to 252 |

Example 4

10 Parts of a copolymer of 48% by weight of vinylidene fluoride and 52% by weight of hexafluoropropylene (intrinsic viscosity 1.7) was milled with 0.2 part of sodium fluoride to thoroughly disperse the NaF. The treated polymer was extruded from a piston extruder at 190° C. to obtain a rope of the polymer at a rate of 0.145 gram per minute.

When the same polymer was extruded under the same conditions but without the added sodium fluoride, the rate of extrusion was 0.0107 gram per minute. Thus, the use of the sodium fluoride produced an increased extrusion rate of 1400%.

Example 5

Following the same procedure of Example 1 and milling a polymer of 64% vinylidene fluoride and 36% hexafluoropropylene having an intrinsic viscosity of 1.15 with 2% of the fluorides of lithium, potassium, copper, calcium, strontium, barium, magnesium, aluminum, lead, zirconium, antimony, zinc, cobalt, chromium, nickel, and manganese, it was observed that etching of the glass occurred within 16 hours.

When the same polymer was milled with 2% sodium fluoride and evaluated, etching of glass occurred only after 64 to 88 hours.

Example 6

75 parts of a solid copolymer containing 48% by weight of vinylidene fluoride units and 52% by weight of hexafluoropropene units was mixed on a rubber roll mill with 25 parts of powdered sodium fluoride. After thorough incorporation the sample was sheeted off the mill.

A portion was sealed in a glass tube under vacuum and then heated at 288° C. for 500 hours. No etching of the tube was noticeable. A control sample containing no sodium fluoride showed considerable etching after only 10 hours.

When the experiment is repeated using 10 parts of sodium fluoride and 90 parts of the copolymer, no etching is observed at the end of 500 hours.

When only 2 parts of sodium fluoride to 98 parts of the copolymer are used in the experiment, it is only after 424 hours that etching corresponding to the control at 10 hours is observed.

This application is a continuation-in-part of application Serial No. 738,611, filed May 29, 1958.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A polymeric fluorine-containing elastomer composition stabilized against the evolution of hydrogen fluoride at temperatures above 200° C., said elastomer being a copolymer of vinylidene fluoride and a fluoroolefin taken from the group consisting of chlorotrifluoroethylene and hexafluoropropylene and containing between about 0.1% and about 25% of sodium fluoride based on the weight of the elastomer.

2. The process of stabilizing a copolymer of vinylidene fluoride and a fluoroolefin taken from the group consisting of chlorotrifluoroethylene and hexafluoropropylene which consists of dispersing throughout said copolymer between about 0.1% to about 25% sodium fluoride by weight of said copolymer.

3. A polymeric fluorine-containing elastomer composition stabilized against the evolution of hydrogen fluoride at temperatures above 200° C., said elastomer being a copolymer of vinylidene fluoride and a fluoroolefin taken from the group consisting of chlorotrifluoroethylene and hexafluoropropylene and containing between about 5% and about 15% of sodium fluoride based on the weight of the elastomer.

References Cited in the file of this patent

UNITED STATES PATENTS

| 2,569,644 | Stilmar | Oct. 2, 1951 |
| 2,695,880 | Benning et al. | Nov. 30, 1954 |
| 2,856,440 | Wolff | Oct. 14, 1958 |